(12) United States Patent
Yamashita et al.

(10) Patent No.: US 7,929,256 B2
(45) Date of Patent: Apr. 19, 2011

(54) THIN FILM MAGNETIC HEAD WITH PROTRUSION HEATER AND TEMPERATURE CORRECTING RESISTOR

(75) Inventors: Tomohiro Yamashita, Niigata-ken (JP); Yuya Kakuhari, Niigata-ken (JP)

(73) Assignee: TDK Corporation, Tokyo (JP)

( * ) Notice: Subject to any disclaimer, the term of this patent is extended or adjusted under 35 U.S.C. 154(b) by 825 days.

(21) Appl. No.: 11/940,003

(22) Filed: Nov. 14, 2007

(65) Prior Publication Data
US 2008/0145709 A1   Jun. 19, 2008

(30) Foreign Application Priority Data
Dec. 15, 2006   (JP) .................................. 2006-338069

(51) Int. Cl.
*G11B 5/56* (2006.01)
(52) U.S. Cl. .................................................... 360/294.4
(58) Field of Classification Search ................ 360/294.7
See application file for complete search history.

(56) References Cited

U.S. PATENT DOCUMENTS
7,729,086 B1 * 6/2010 Song et al. ............... 360/125.31

FOREIGN PATENT DOCUMENTS
JP   2005-011413   1/2005
JP   2006-228332   8/2006

* cited by examiner

*Primary Examiner* — A. J. Heinz
(74) *Attorney, Agent, or Firm* — Brinks Hofer Gilson & Lione

(57) ABSTRACT

A thin film magnetic head is disclosed that is capable of preventing the contact between an element portion and a recording medium and a variation in the amount of protrusion of the element portion. A thin film magnetic head includes: a reproducing element; a recording element that is formed on the reproducing element; a heater that is supplied with power and generates heat to expand at least one of the reproducing element and the recording element such that the reproducing element and/or the recording element protrude toward a recording medium; and a temperature correcting resistor that is connected in parallel to the heater and has a negative resistance temperature coefficient.

6 Claims, 4 Drawing Sheets

THIN FILM MAGNETIC HEAD WITH PROTRUSION HEATER AND TEMPERATURE CORRECTING RESISTOR

CLAIM OF PRIORITY

This application claims benefit of the Japanese Patent Application No. 2006-338069 filed on Dec. 15, 2006, which is hereby incorporated by reference.

BACKGROUND OF THE INVENTION

1. Field of the Invention

The present invention relates to a thin film magnetic head having a heater that generates heat to expand a reproducing element and a recording element toward a recording medium.

2. Description of the Related Art

A thin film magnetic head used for, for example, a magnetic disk apparatus includes a reproducing element that reads out magnetic recording information from a recording medium using magnetoresistance and a recording element that applies a recoding magnetic field to the recording medium to record various information items on the recording medium. The reproducing element has a multi-layer film that exhibits magnetoresistance between a lower shield layer and an upper shield layer opposite to each other at a predetermined gap therebetween on a surface facing a recording medium. The recording element is formed on the upper shield layer, and includes a pair of magnetic layers opposite to each other with a magnetic gap layer interposed therebetween on the surface facing a recording medium, and a recording coil that applies a recoding magnetic field to the pair of magnetic layers. In recent years, a thin film magnetic head has been proposed which includes a heater that is supplied with power and generates heat that is provided in the vicinities of a reproducing element and a recording element. In the thin film magnetic head including the heater, heat generated by the heater causes the reproducing element and the recording element to protrude toward a recording medium. Then, the gap (the lift of the head) between the recording medium and an element portion is locally narrowed, which makes it possible to improve recording and reproducing characteristics.

However, the amount of protrusion of the element portion due to thermal expansion depends on the external environmental temperature as well as the amount of heat generated by the heater. For example, as the external environmental temperature increases, the amount of protrusion of the element portion becomes larger. Therefore, when the external environmental temperature is high during the operation of the heater, there is a fear that the element portion will come into contact with a recording medium and the element portion and the recording medium will be damaged. In order to solve this problem, a method of reducing the amount of heat generated from the heater to reduce thermal expansion of the element portion has been proposed. However, the method of reducing only the amount of heat generated from the heater is insufficient to solve the above-mentioned problem since the thermal expansion of the element portion is also generated due to the external environmental temperature. That is, the thermal expansion of the element portion is generated due to both the heat generated by the heater and the external environmental temperature (when the external environmental temperature is high) or only the heat generated by the heater (when the external environmental temperature is low). The amount of protrusion of the element portion varies according to the external environmental temperature. When the amount of protrusion of the element portion varies, the gap between the element portion and the recording medium varies, which results in low reliability.

SUMMARY

According to an aspect of the disclosure, a thin film magnetic head includes: a reproducing element; a recording element that is formed on the reproducing element; a heater that is supplied with power and generates heat to expand at least one of the reproducing element and the recording element such that the reproducing element and/or the recording element protrude toward a recording medium; and a temperature correcting resistor that is connected in parallel to the heater and has a negative resistance temperature coefficient.

When the external environmental temperature is high, the resistance value of the temperature correcting resistor having a negative resistance temperature coefficient decreases. When the external environmental temperature is low, the resistance value of the temperature correcting resistor increases. Therefore, in a closed circuit composed of the temperature correcting resistor and the heater, when the external environmental temperature increases, the amount of current flowing through the temperature correcting resistor increases, and the amount of current flowing through the heater decreases, resulting in a reduction in the amount of heat generated from the heater. In this case, the amount of protrusion of the element portion due to the external environmental temperature increases, but the amount of protrusion of the element portion due to heat generated from the heater is reduced. As a result, it is possible to prevent a variation in the amount of protrusion of the element portion even when the external environmental temperature varies.

In the thin film magnetic head according to the above-mentioned aspect, preferably, the temperature correcting resistor has a pair of electrode lines on both surfaces in the thickness direction thereof. According to the above-mentioned structure, since current flows in the thickness direction of the temperature correcting resistor, it is possible to easily set an optimum resistance value by controlling the thickness of the temperature correcting resistor and the area of a pattern of the temperature correcting resistor.

According to an embodiment of the invention, the amount of current flowing through a heater is automatically controlled according to the external environmental temperature by a temperature correcting resistor, and the amount of protrusion of an element portion due to heat generated from the heater is corrected such that increment and decrement in the amount of protrusion of the element portion due to the external environmental temperature offset each other. Therefore, it is possible to provide a thin film magnetic heat capable of preventing a variation in the amount of protrusion of the element portion even when the external environmental temperature varies, and thus preventing the contact between the element portion and a recording medium.

DESCRIPTION OF THE EMBODIMENTS

Figure 1:
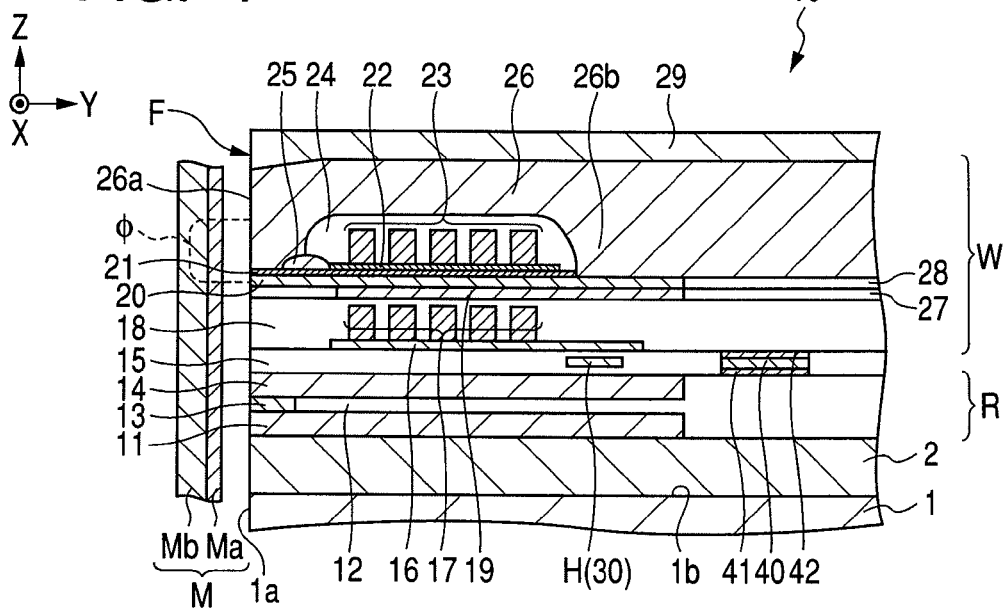
FIG. 1 is a cross-sectional view illustrating a laminated structure of a thin film magnetic head according to an embodiment of the disclosure, which is taken along the center line of an element (a cross-sectional view taken along the line I-I of FIG. 2)
Figure 2:
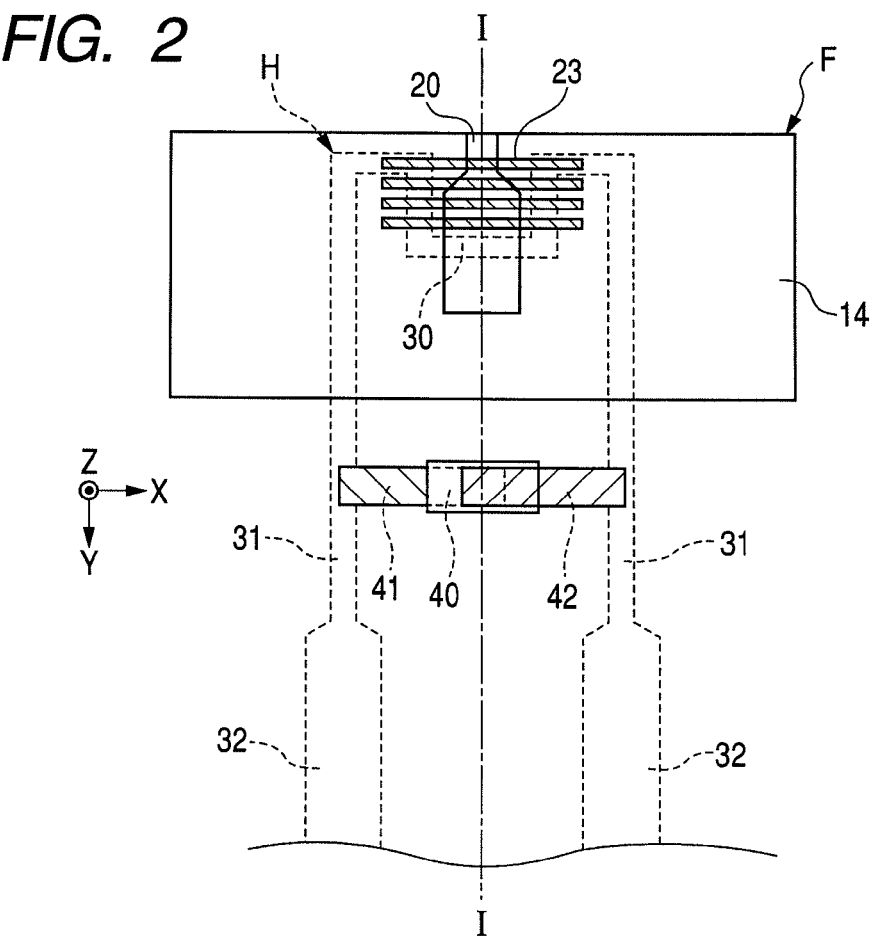
FIG. 2 is a plan view illustrating the thin film magnetic head, as viewed from the upper side of the head.

FIGS. 1 and 2 show a cross-sectional view and a plan view illustrating the structure of a thin film magnetic head according to an embodiment of the invention. In FIGS. 1 and 2, an X direction indicates a track width direction, a Y direction indicates a height direction, and a Z direction indicates a direction in which layers of the thin film magnetic head are laminated.

The thin film magnetic head according to this embodiment includes a head structure 10 formed by laminating a thin film on a trailing side surface 1b of a slider 1. The head structure 10 includes a reproducing head R that reads out magnetic recording information from a recording medium M using magnetoresistance, a vertical recording type recording head W that vertically applies a recoding magnetic field Φ to the recording medium M to record magnetic information on the recording medium, and a heater H that is supplied with power and generates heat.

The recording medium M has a hard film Ma having high residual magnetization on an outer surface thereof and a soft film Mb having high magnetic permeability below the hard film Ma. The slider 1 is formed of a non-magnetic material, such as $Al_2O_3$ or TiC. When the recording medium M rotates, the slider 1 lifts from the surface of the recording medium M due to airflow on the surface. An end surface 1a of the slider 1 faces the recording medium M.

The reproducing head R is formed on a protective layer 2 that is formed on a trailing surface 1b of the slider 1 and is made of a non-magnetic insulating material, such as $Al_2O_3$ or $SiO_2$. The reproducing head R includes a lower shield layer 11 that is formed on the protective layer 2, an upper shield layer 14 that is opposite to the lower shield layer 11 at a predetermined gap therebetween, a gap insulating layer 12 that is provided between the lower shield layer 11 and the upper shield layer 14, and a reproducing element 13 that is provided in the gap insulating layer 12. The reproducing element 13 is a magnetoresistive element, such as an AMR, GMR, or TMR element, and the dimension of the reproducing element 13 in the X direction of FIGS. 1 and 2 serves as a reproducing track width.

The recording head W is provided on the upper shield layer 14 with a separating layer 15 interposed therebetween. The separating layer 15 is formed of, for example, $Al_2O_3$. The recording head W includes: a main magnetic pole layer 20 and a return yoke layer 26 that are formed of a ferromagnetic material; a magnetic gap layer 21 that is interposed between the main magnetic pole layer 20 and the return yoke layer 26 on a surface F facing the recording medium M (a surface facing a recording medium); a recording coil layer that includes a lower coil layer 17 and an upper coil layer 23; an auxiliary yoke layer 19 that is formed of a magnetic material having a lower saturation magnetic flux density than that forming the main magnetic pole layer 20 and is formed immediately below the main magnetic pole layer 20; insulating layers 27 and 28 that cover the peripheries of the main magnetic pole layer 20 and the auxiliary yoke layer 19, respectively; and a height determining layer 25 that is formed on the magnetic gap layer 21 at a position that is recessed from the surface F facing the recording medium by a predetermined distance. For the side surface of the main magnetic pole layer 20 exposed from the surface F facing the recording medium, a length thereof in the X direction of FIGS. 1 and 2 serves as a writing track width. The size of the return yoke layer 26 is larger than that of the main magnetic pole layer 20 in the X direction and the Y direction of FIGS. 1 and 2. A portion of the return yoke layer 26, which is in the range between an end surface 26a exposed from the surface F facing the recording medium and a position that is recessed from the end surface 26a by a predetermined distance (gap), faces the main magnetic pole layer 20. In addition, the return yoke layer 26 is connected to the main magnetic pole layer 20 by a connecting portion 26b that is positioned at the rear side of the end surface 26a in the height direction. The lower coil layer 17 and the upper coil layer 23 have a plurality of coils that extend in the track width direction and are aligned in the height direction. The ends of the coils in the track width direction are connected to each other such that the connected coils are wound around the main magnetic pole layer 20 and the auxiliary yoke layer 19, thereby forming a solenoid. The lower coil layer 17 and the upper coil layer 23 are formed on coil insulating base layers 16 and 22, respectively. In addition, the lower coil layer 17 and the upper coil layer 23 are covered with coil insulating layers 18 and 24 that are formed of, for example, $Al_2O_3$. A protective layer 29 formed of, for example, $Al_2O_3$ is formed on the return yoke layer 26.

Figure 3:
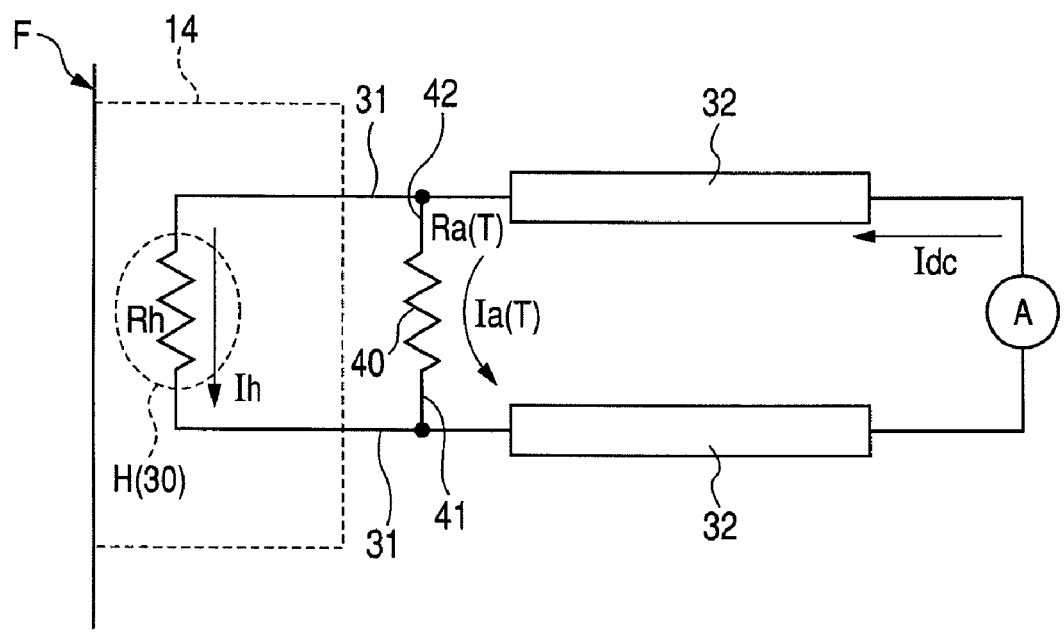
FIG. 3 is a plan view schematically illustrating a first arrangement aspect of a temperature correcting resistor.

The heater H is provided in the separating layer 15 interposed between the reproducing head R and the recording head W. As shown in FIG. 2, the heater H includes a heat generating region 30 that actually generates heat and has an M shape in plan view, a pair of lead electrodes 31 that extend in the height direction from both ends of the heat generating region 30 in the track width direction, and a pair of lead lines 32 that have a larger width than that of the lead electrode 31 and electrically connect the pair of lead electrodes 31 to electrode pads (not shown) provided on the surface of the head. The heat generating region 30 has an arbitrary pattern shape. For example, the heat generating region 30 may have a meander shape. An external power supply is connected to the electrode pads formed on the surface of the head, and a current flow to the heat generating region 30 of the heater H through the pair of lead lines 32 and the pair of lead electrodes 31 in the track width direction. The heat generating region 30 of the heater H is a resistor having a resistance value Rh, and a current Ih flows to the heat generating region 30 (FIG. 3). The heater H is formed of, for example, NiFe, CuNi, or CuMn.

Heat generated from the heater H is transmitted to the surface F facing the recording medium to expand the head structure 10. In the head structure 10, the upper and lower shield layers 11 and 14 and the main magnetic pole layer 20 that have larger thermal expansion coefficients than those of the separating layer 15, the coil insulating layer 18, and the gap insulating layer 12 formed of $Al_2O_3$ are likely to thermally expand. The main magnetic pole layer 20 and the reproducing element 13 interposed between the upper and lower shield layers 11 and 14 locally protrude toward the recording medium M by the thermal expansion. In this case, as the amount of heat generated from the heater H increases, the amount of protrusion of the reproducing element 13 and the main magnetic pole layer 20 becomes larger, and the distances between the recording medium M and the reproducing element 13 and the main magnetic pole layer 20 are shortened, which results in the improvement of recording and reproducing characteristics.

Hereinafter, the reproducing element 13 and the main magnetic pole layer 20 contributing to the improvement of recording and reproducing characteristics are referred to as an 'element portion', and the amount of protrusion of the reproducing element 13 and the main magnetic pole layer 20 toward the recording medium M is referred to as 'the amount of protrusion of the element portion'.

The amount of protrusion of the element portion is obtained by adding the amount of protrusion of the element portion due to heat generated from the heater and the amount of protrusion of the element portion due to an external environmental temperature. The amount of protrusion of the element portion due to the external environmental temperature varies according to the external environmental temperature. That is, as the external environmental temperature increases, the amount of protrusion of the element portion due to the external environmental temperature becomes larger. Therefore, when the external environmental temperature is low, the amount of protrusion of the element portion depends on the amount of heat generated from the heater. When the external environmental temperature is high, the amount of protrusion of the element portion depends on both the amount of heat generated from the heater and the external environmental temperature. Since the amount of protrusion of the element portion prescribes the distance between the element portion and the recording medium M, it is preferable that the amount of protrusion of the element portion be maintained at a constant value regardless of the external environmental temperature during recording and reproducing operations.

In the thin film magnetic head having the above-mentioned structure, the head structure 10 includes a temperature correcting resistor 40, serving as a temperature correcting unit for correcting a variation in the amount of protrusion of the element portion due to the external environmental temperature. FIG. 3 is a diagram illustrating a first arrangement aspect of the temperature correcting resistor 40. As shown in FIGS. 2 and 3, the temperature correcting resistor 40 is connected in parallel to the heater H and forms a closed circuit between the heater H and an external power supply A.

The temperature correcting resistor 40 has a negative temperature resistance coefficient. Therefore, when an external environmental temperature T is high, a resistance value $Ra(T)$ decreases, and when the external environmental temperature T is low, the resistance value $Ra(T)$ increases. In this embodiment, specifically, it is assume that an external environmental temperature of 50° C. or more is referred to as a high temperature and an external environmental temperature that is lower than 5° C. is referred to as a lower temperature. The temperature correcting resistor 40 is formed of a metal oxide film containing one or more kinds of materials selected from Fe, Ni, Co, Cr, V, Mn, Mg, Cu, Ti, and Ai. The metal oxide film is formed by sputter deposition, or by forming a metal film that contains at least one of Fe, Ni, Co, Cr, V, Mn, Mg, Cu, Ti, and Ai and oxidizing the metal film.

The temperature correcting resistor 40 is provided between the pair of lead electrodes 31 of the heater H at the rear side of the upper shield layer 14 in the height direction. When the temperature correcting resistor 40 is provided at the rear side of the upper shield layer 14 in the height direction, heat generated from the temperature correcting resistor 40 when power is supplied is not transmitted to the element portion, and has no effect on the protrusion of the element portion.

The temperature correcting resistor 40 is formed at the same position as the heater H, and is connected between the pair of lead electrodes 31 of the heater H through a pair of electrode lines 41 and 42. The electrode line 41 connects the lead electrode 31 and the lower surface of the temperature correcting resistor 40, and the electrode line 42 connects the lead electrode 31 and the upper surface of the temperature correcting resistor 40. In this way, a current $Ia(T)$ flows in the thickness direction (the Z direction in FIG. 3) of the temperature correcting resistor 40. When an external environmental temperature is T, a specific resistance is $\rho(T)$, the thickness of the temperature correcting resistor 40 is t, and the cross section of the temperature correcting resistor 40 is S, the resistance value $Ra(T)$ of the temperature correcting resistor 40 is determined by the following expression: $Ra(T)=\rho(T)(t/S)$. In this case, the resistance value $Ra(T)$ and the specific resistance $\rho(T)$ are functions for the temperature, and the specific resistance $\rho(T)$ depends on a material forming the metal oxide film. Therefore, it is possible to achieve the temperature correcting resistor 40 having the resistance value $Ra(T)$ corresponding to the head by controlling a material forming the temperature correcting resistor 40, the thickness t, and the cross section S.

In the closed circuit composed of the temperature correcting resistor 40 and the heater H, when the external environmental temperature is high, the resistance value $Ra(T)$ of the temperature correcting resistor 40 decreases, and the current $Ia(T)$ flowing through the temperature correcting resistor 40 increases. As a result, a current Ih flowing through the heater H is reduced, which results in a reduction in the amount of heat generated from the heater. The overall current Idc flowing through the closed circuit is the sum of the current $Ia(T)$ flowing through the temperature correcting resistor 40 and the current Ih flowing through the heater H. In this case, the amount of protrusion of the element portion due to the external environmental temperature increases, and the amount of protrusion of the element portion due to the heat generated from the heater decreases. Therefore, an increment and a decrement in the amount of protrusion of the element portion offset each other, which makes it possible to prevent a variation in the amount of protrusion of the element portion. In contrast, when the external environmental temperature is low, the resistance value $Ra(T)$ of the temperature correcting resistor 40 increases, and the current $Ia(T)$ flowing through the temperature correcting resistor 40 decreases. As a result, the current Ih flowing through the heater H increases, which results in an increase in the amount of heat generated from the heater. In this case, the amount of protrusion of the element portion due to the external environmental temperature decreases, and the amount of protrusion of the element portion due to the heat generated from the heater increases. Therefore, increment and decrement in the amount of protrusion of the element portion offset each other, which makes it possible to prevent a variation in the amount of protrusion of the element portion. In this way, the amount of current flowing through the heater H is automatically controlled according to the external environmental temperature by the temperature correcting resistor 40, and the amount of protrusion of the element portion due to heat generated from the heater is corrected such that increment and decrement in the amount of protrusion of the element portion due to the external environmental temperature offset each other. Therefore, even when the external environmental temperature varies, a variation in the amount of protrusion of the element portion is prevented, and the element portion does not protrude as much as it contacts with the recording medium M.

Figure 4:
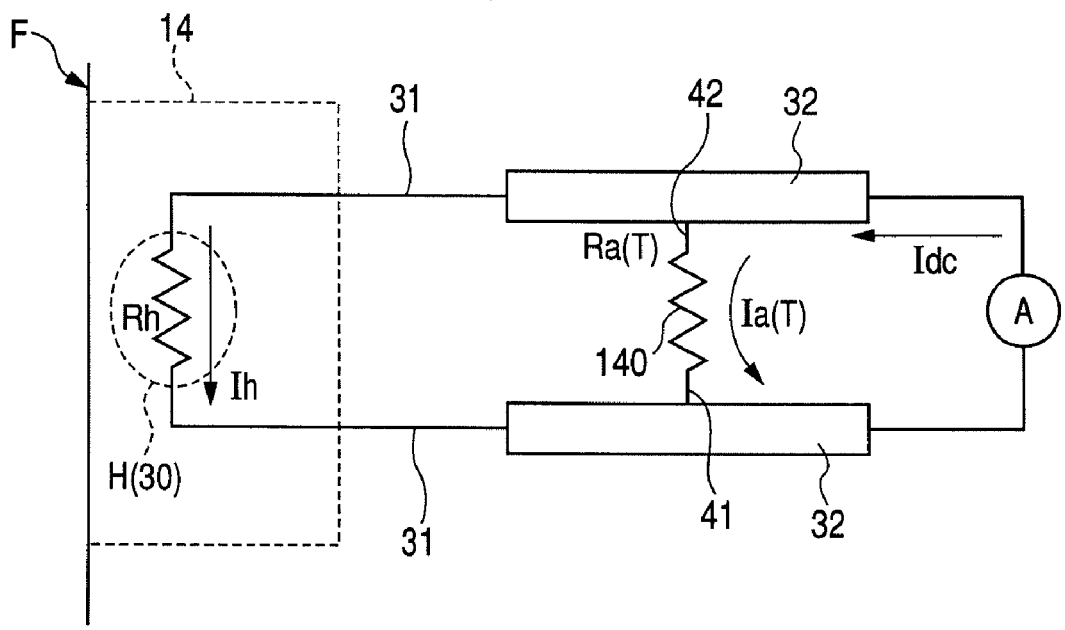
FIG. 4 is a plan view schematically illustrating a second arrangement aspect of the temperature correcting resistor.

FIG. 4 is a diagram illustrating another arrangement aspect of a temperature correcting resistor 140 that is different from that shown in FIG. 3. The temperature correcting resistor 140 is provided between a pair of lead lines 32 of the heater H at the rear side of the upper shield layer 14 in the height direction. The temperature correcting resistor 140 is connected between the pair of lead lines 32 through a pair of electrode lines 41 and 42. The electrode line 41 connects the lead line 32 and the lower surface of the temperature correcting resistor 140, and the electrode line 42 connects the lead line 32 and the upper surface of the temperature correcting resistor 140. In this way, the current Ia(T) flows in the thickness direction of the temperature correcting resistor 140. The temperature correcting resistor 140 is similar to the temperature correcting resistor 40 according to the first embodiment shown in FIGS. 2 and 3 except for the position where the heater H is connected. In this embodiment, similar to the first embodiment, the current Ih flowing through the heater H is automatically controlled according to the external environmental temperature by the temperature correcting resistor 140. Therefore, even when the external environmental temperature varies, it is possible to prevent a variation in the amount of protrusion of the element portion, and thus prevent the contact between the element portion and the recording medium M. It is preferable that the temperature correcting resistor 140 be provided at a position where the amount of protrusion of the element portion is not affected, that is, the temperature correcting resistor 140 be connected between the pair of lead lines 32 at a position that is closer to the surface F facing the recording medium at the rear side of the upper shield layer 14 in the height direction, in order to accurately detect the peripheral temperature of the element portion.

Figure 5:
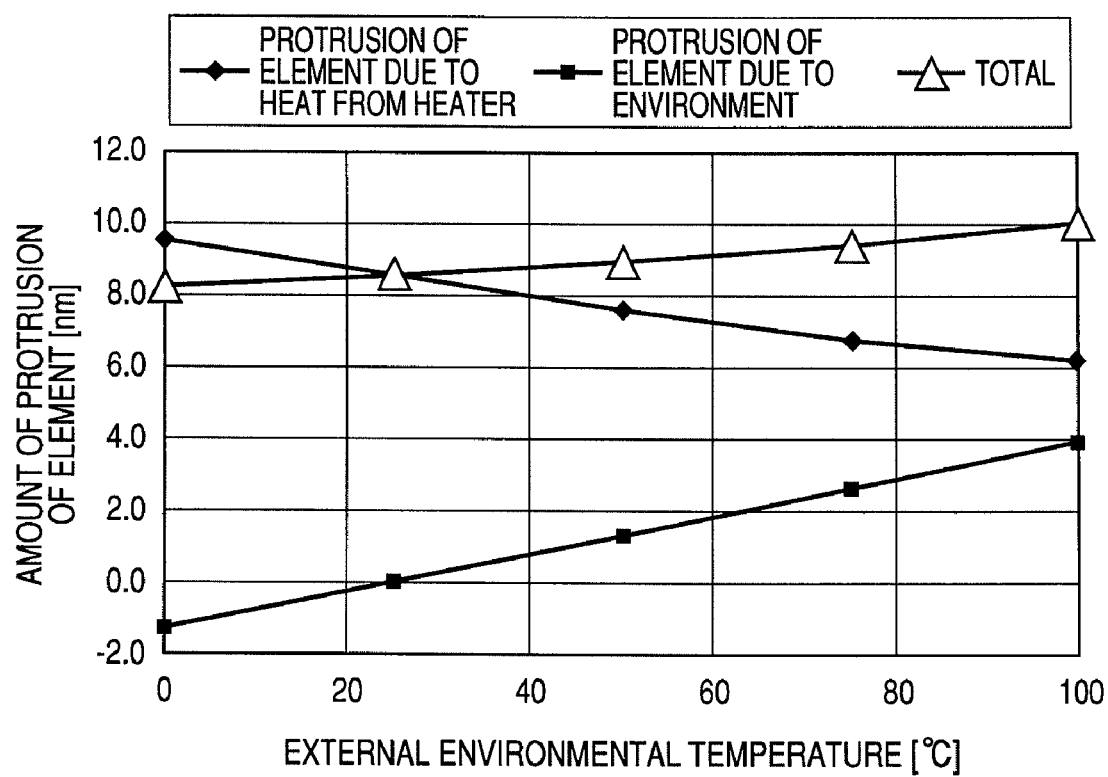
FIG. 5 is a graph illustrating the amount of protrusion of an element portion when an external environmental temperature varies in the thin film magnetic head including the temperature correcting resistor (example)
Figure 6:
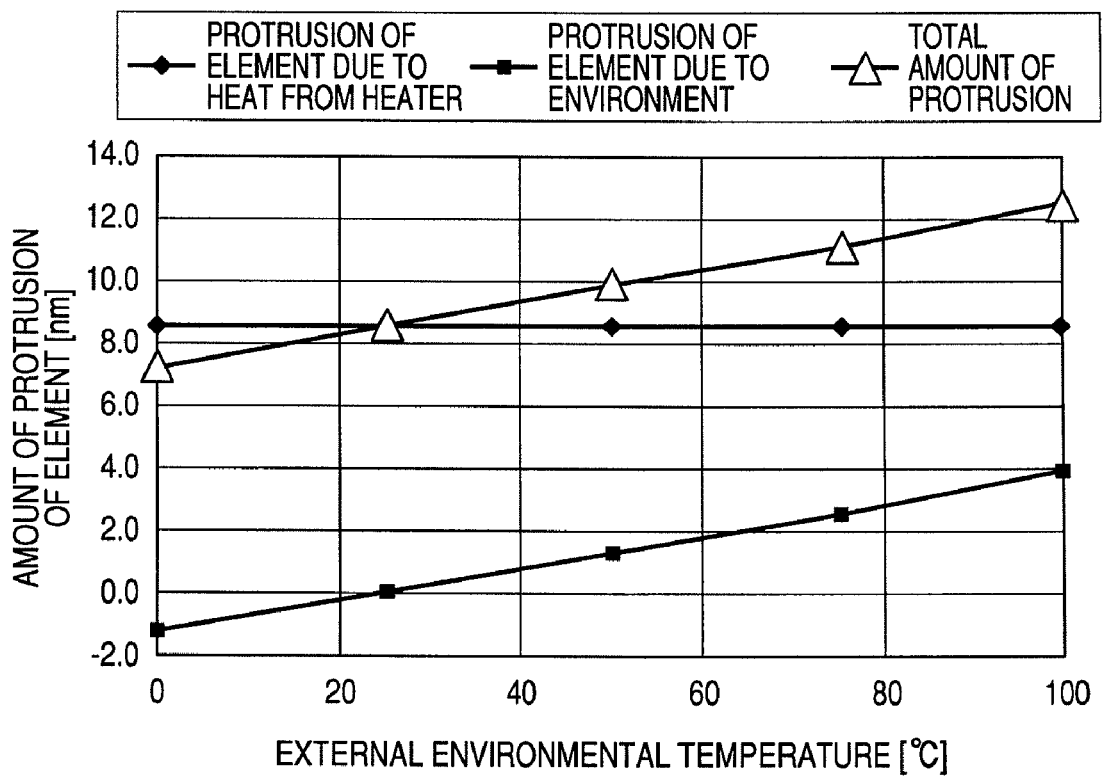
FIG. 6 is a graph illustrating the amount of protrusion of an element portion when the external environmental temperature varies in a thin film magnetic head not including the temperature correcting resistor (comparative example)

FIGS. 5 and 6 are graphs illustrating the amount of protrusion of the element portion measured at an external environmental temperature in the range of 0° C. to 100° C. in a thin film magnetic head (example) including the temperature correcting resistor 40 (140) connected in parallel to the heater H and a thin film magnetic head (comparative example) not including the temperature correcting resistor. In the graphs, the amount of protrusion of the element portion measured at a room temperature of 25° C. at a predetermined position on the surface F facing the recording medium is used as a reference value 0. In addition, the amount of protrusion of the element portion due to the external environmental temperature, the amount of protrusion of the element portion due to heat generated from the heater, and the overall amount of protrusion of the element portion are separately shown in the graphs. In this case, the same power is supplied to the heater H and the temperature correcting resistor 40 (140). The example and the comparative example have the same structure except that the example includes the temperature correcting resistor 40 (140).

FIG. 5 is a graph illustrating the amount of protrusion of the element portion when the external environmental temperature varies from 0° C. to 100° C. in the thin film magnetic head (example) including the temperature correcting resistor 40 (140). As can be seen from FIG. 5, the amount of protrusion of the element portion due to the external environmental temperature increases as the external environmental temperature increases, but the amount of protrusion of the element portion due to heat generated from the heater decreases as the external environmental temperature increases. Therefore, even when the external environmental temperature varies from 0° C. to 100° C., the overall amount of protrusion of the element portion is maintained to be smaller than 2 nm. In the actual state, the lift of the head is maintained in the range of 10 to 15 nm, but the amount of protrusion of the element portion is maintained to be smaller than 10 nm, which makes it possible to prevent the contact between the element portion and the recording medium M.

FIG. 6 is a graph illustrating the amount of protrusion of the element portion when the external environmental temperature varies from 0° C. to 100° C. in the thin film magnetic head (comparative example) not including the temperature correcting resistor. As can be seen from FIG. 6, the amount of protrusion of the element portion due to the external environmental temperature increases as the external environmental temperature increases, but the amount of protrusion of the element portion due to heat generated from the heater is kept constant regardless of the external environmental temperature. Therefore, as the external environmental temperature increases, the overall amount of protrusion of the element portion increases. When the external environmental temperature varies from 0° C. to 100° C., the difference between the overall amounts of protrusion of the element portion at the temperatures of 0° C. and 100° C. is larger than 5 nm. In addition, when the external environmental temperature is higher than 50° C., the overall amount of protrusion of the element portion is larger than 10 nm. In the actual state in which the lift of the head is maintained in the range of 10 to 15 nm, there is a fear that the element portion will contact with the recording medium M.

As can be seen from the comparison between FIGS. 5 and 6, the temperature correcting resistor 40 (140) connected in parallel to the heater H makes it possible to prevent a variation in the amount of protrusion of the element portion even when the external environmental temperature varies.

In this embodiment, the temperature correcting resistor 40 (140) is formed at the same height as that of the heater H, but the invention is not limited thereto. The temperature correcting resistor may be formed at an arbitrary height. For example, the temperature correcting resistor may be formed above the heater H.

Figure 7:
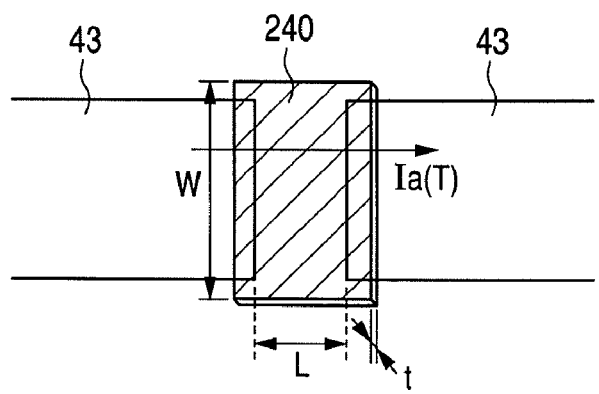
FIG. 7 is a plan view illustrating another electrical connection structure of the temperature correcting resistor.

In this embodiment, the current Ia(T) flows in the thickness direction (the Z direction in the drawings) of the temperature correcting resistor 40, but the invention is not limited thereto. As shown in FIG. 7, a pair of electrode lines 43 may be provided at both sides of a temperature correcting resistor 240 in the track width direction, and the current Ia(T) may flow through the electrode lines 43. In this case, when an external environmental temperature is T, a specific resistance is $\rho(T)$, the distance between the pair of electrode lines 43 is L, the thickness of the temperature correcting resistor 240 is t, and the width of the temperature correcting resistor 240 is w, the resistance value Ra(T) of the temperature correcting resistor 240 is determined by the following expression: $Ra(T)=\rho(T)(L/(t\times w))$. The structure in which the current Ia(T) flows in the thickness direction of the temperature correcting resistor 240 makes it possible to simply and appropriately set the resistance value Ra(T) of the temperature correcting resistor 240.

In this embodiment, the heater H is provided in the separating layer 15 interposed between the reproducing head R and the recording head W, but the invention is not limited thereto. The heater H may be provided at any position. For example, the heater H may be provided between the return yoke layer 26 and the protective layer 29.

In this embodiment, the vertical recording type recording head W is provided, but the invention is not limited thereto. The invention can be applied to a thin film magnetic head provided with a longitudinal recording type recording head.

The invention claimed is:
1. A thin film magnetic head comprising:
a reproducing element;
a recording element that is disposed on the reproducing element;
a heater that is supplied with power and generates heat to expand at least one of the reproducing element and the recording element such that the reproducing element and/or the recording element protrude toward a recording medium; and a temperature correcting resistor that is connected in parallel to the heater and has a negative resistance temperature coefficient.

2. The thin film magnetic head according to claim 1, wherein the temperature correcting resistor has a pair of electrode lines on both surfaces in the thickness direction thereof.

3. The thin film magnetic head according to claim 1, wherein the temperature correcting resistor is provided at the rear side of a shield layer of the reproducing element in a height direction.

4. The thin film magnetic head according to claim 3, wherein the temperature correcting resistor is provided between lead electrodes of the heater.

5. The thin film magnetic head according to claim 3, wherein the temperature correcting resistor is connected between a pair of lead lines for connecting the lead electrodes of the heater and electrode pads formed on the surface of the head.

6. The thin film magnetic head according to claim 1, wherein the temperature correcting resistor is formed of a metal oxide film containing at least one of Fe, Ni, Co, Cr, V, Mn, Mg, Cu, Ti, and Al.

* * * * *